(12) United States Patent
Olson (10) Patent No.: US 8,547,887 B2
(45) Date of Patent: Oct. 1, 2013

(54) WIRELESS INTERFACE CONTROL TO REDUCE POWER CONSUMPTION

(75) Inventor: Timothy S. Olson, San Jose, CA (US)

(73) Assignee: Shoretel, Inc., Sunnyvale, CA (US)

( * ) Notice: Subject to any disclaimer, the term of this patent is extended or adjusted under 35 U.S.C. 154(b) by 1280 days.

(21) Appl. No.: 11/967,451

(22) Filed: Dec. 31, 2007

(65) Prior Publication Data

US 2009/0168676 A1 Jul. 2, 2009

(51) Int. Cl.
*G08C 17/00* (2006.01)
*H04W 4/00* (2009.01)

(52) U.S. Cl.
USPC ............ 370/311; 370/328; 370/331; 370/338

(58) Field of Classification Search
USPC ........................................................ 370/311
See application file for complete search history.

(56) References Cited

U.S. PATENT DOCUMENTS

| | | | |
|---|---|---|---|
| 6,360,097 B1 | 3/2002 | Smith et al. | |
| 7,200,112 B2 | 4/2007 | Sundar et al. | |
| 2004/0120278 A1* | 6/2004 | Krantz et al. | 370/328 |
| 2004/0259546 A1* | 12/2004 | Balachandran et al. | 455/435.2 |
| 2004/0264414 A1* | 12/2004 | Dorenbosch | 370/338 |
| 2006/0063560 A1 | 3/2006 | Herle | |
| 2006/0121894 A1* | 6/2006 | Ganesan | 455/432.1 |
| 2006/0262739 A1* | 11/2006 | Ramirez et al. | 370/311 |
| 2007/0037610 A1 | 2/2007 | Logan | |
| 2007/0099653 A1* | 5/2007 | Parron et al. | 455/552.1 |
| 2007/0110017 A1 | 5/2007 | Fulknier et al. | |
| 2007/0254619 A1 | 11/2007 | Salomone et al. | |

OTHER PUBLICATIONS

PCT International Search Report mailed Feb. 10, 2009, Agito Networks, Inc.
PCT Written Opinion of the International Searching Authority, Feb. 10, 2009, Agito Networks, Inc.

* cited by examiner

*Primary Examiner* — Ian N Moore
*Assistant Examiner* — Jenee Alexander
(74) *Attorney, Agent, or Firm* — Tarolli, Sundheim, Covell & Tummino LLP (57) ABSTRACT

A wireless mobile unit includes a first wireless interface configured to at least receive communication over a first wireless network. A second wireless interface is configured to provide for bidirectional communication over a second wireless network. An interface control is operative to control activation of the second wireless interface from an off state to an on state in response to a predefined radio frequency (RF) stimulus, the first wireless interface remaining in an on state regardless of the state of the second wireless interface.

29 Claims, 5 Drawing Sheets

WIRELESS INTERFACE CONTROL TO REDUCE POWER CONSUMPTION

TECHNICAL FIELD

The present invention relates generally to communications and, more particularly, to controlling a wireless interface to reduce power consumption.

BACKGROUND

Various types of wireless technologies have been developed for communication of voice, data and a combination of voice and data. Many wireless devices are being manufactured to enable operability in more than one type of technology. For example, portable electronic devices, such as cellular telephones and personal digital assistants, can include interfaces that enable operation using cellular technologies, wireless local area network (WLAN) technologies, and/or Bluetooth technologies to name a few.

As a further example, many enterprise networks support voice over internet protocol (VoIP) that can run over one or more wireless network. For instance, WiFi voice networks currently support VoIP and, with little integration, with a wider area voice network, such as cellular networks. Dual mode phones, which have both an 802.11 interface and a cellular interface, are emerging in the marketplace. However, multiple wireless interfaces operating concurrently in such phones tend to reduce battery life due to the amount of power consumption.

SUMMARY

This invention relates generally to systems and methods aimed to reducing power consumption in a mobile unit.

One aspect of the invention provides a wireless mobile unit that includes a first wireless interface configured to at least receive communication over a first wireless network. A second wireless interface is configured to provide for bidirectional communication over a second wireless network. An interface control is operative to control activation of the second wireless interface from an off state to an on state in response to a predefined radio frequency (RF) stimulus, the first wireless interface remaining in an on state regardless of the state of the second wireless interface.

Another aspect of the invention provides a wireless mobile unit that includes a first wireless interface configured to provide for bidirectional communication over a first wireless network. The mobile unit also includes a second wireless interface configured to provide for bidirectional communication over a second wireless network. The first wireless network is a wider network than the second wireless network. An interface control is operative to activate the second wireless interface from a powered-off state to an on state based on communication that occurs via the first wireless interface.

Yet another aspect of the invention provides a method to help reduce power consumption in a mobile unit that includes a plurality of wireless interfaces. The method includes operating at least a first of the plurality of wireless interfaces to be capable of receiving a radio frequency signal. Activation of a second of the plurality of wireless interfaces is controlled from a powered off state to an on state based on at least one of (i) an operating state of the first of the plurality of the wireless interfaces and (ii) a location of the mobile unit.

DETAILED DESCRIPTION

The invention relates generally to systems and methods aimed to reducing power consumption in a mobile unit. For example, the approach described herein is operative to activate a wireless interface from a powered-off state to an on state in response to detecting a predefined stimulus. The stimulus can correspond to an operating state associated with a different wireless interface. Additionally or alternatively, the stimulus can be based on location, such as by detecting that the mobile unit resides within a general proximity of a wireless network. The location of the mobile unit may be determined based on a radio frequency signal received from a wireless interface different from the interface being activated.

As will be appreciated by those skilled in the art, portions of the invention may be embodied as a method, data processing system, or computer program product. Accordingly, these portions of the present invention may take the form of an entirely hardware embodiment, an entirely software embodiment, or an embodiment combining software and hardware. Furthermore, portions of the invention may be a computer program product on a computer-usable storage medium having computer readable program code on the medium. Any suitable computer-readable medium may be utilized including, but not limited to, static and dynamic storage devices, hard disks, optical storage devices, and magnetic storage devices.

Certain embodiments of the invention are described herein with reference to flowchart illustrations of methods, systems, and computer program products. It will be understood that blocks of the illustrations, and combinations of blocks in the illustrations, can be implemented by computer-executable instructions. These computer-executable instructions may be provided to one or more processor of a general purpose computer, special purpose computer (e.g., a mobile unit), or other programmable data processing apparatus (or a combination of devices and circuits) to produce a machine, such that the instructions, which execute via the processor, implement the functions specified in the block or blocks.

These computer-executable instructions may also be stored in computer-readable memory that can direct a computer or other programmable data processing apparatus to function in a particular manner, such that the instructions stored in the computer-readable memory result in an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

As used herein, the term "wireless network" and variations of this term are intended to encompass any form of wireless communication network that may be utilized to send, to receive or to send and receive audio signals (including voice signals), data signals or a combination of voice and data signals without requiring a hard-wired connection. Examples of different wireless networks include: cellular communication networks (e.g., 2G, 3G or 4G technologies); wireless local area networks (WLAN), such as WiFi; wireless metropolitan area networks (WirelessMAN), such as WiMax; and any variation and improvements thereof), satellites, and any combinations thereof. Those skilled in the art will understand and appreciate that various standards and protocols exist and have yet to be developed to enable communication via these and other wireless networks.

Figure 1:
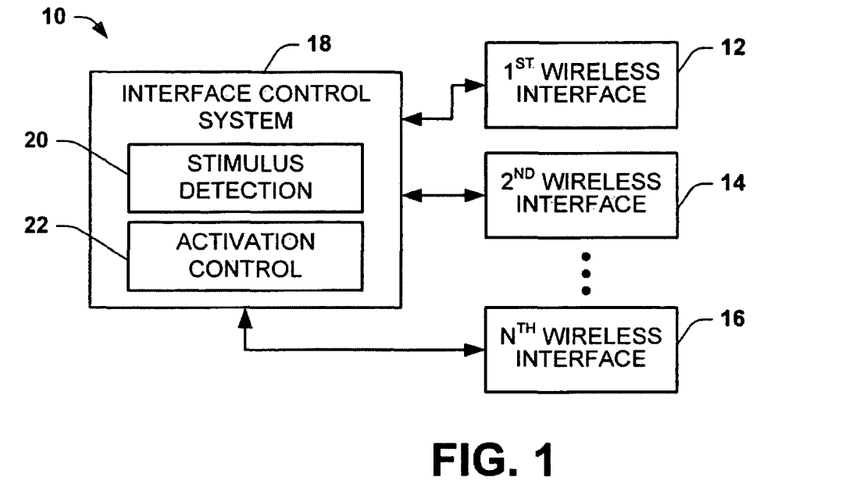
FIG. 1 depicts an example of a system that can be implemented according to an aspect of the invention.

Turning to FIG. 1, a system 10 to reduce power consumption for a mobile unit is depicted. That is, system 10 thus can form part of the mobile unit. For purposes of this example, the system 10 includes a plurality of wireless interfaces 12, 14 and 16, depicted as a first wireless interface, a second wireless interface through an Nth wireless interface (where N is a positive integer denoting the number of wireless interfaces (e.g., N>1)). Thus, the mobile unit implementing the system can be considered a multi-mode mobile device having N wireless interfaces. Each of the wireless interfaces 12, 14 and 16 is programmed and/or configured to provide for wireless communication over a wireless network implementing a respective radio technology. By radio technology, it is meant to include any form of wireless communication that may be utilized to send, to receive or to send and receive audio signals, data signals (which may also include audio and/or video) or a combination of audio and data signals without requiring a hard-wired connection. One example of a unidirectional interface that may be implemented in the system 10 is an interface that includes a GPS receiver configured to receive a navigation message broadcast from satellites over a predefined frequency band. Examples of bidirectional wireless interfaces include a cellular interface (e.g., GSM or PCS) and a WiFi interface (e.g., implemented according to an IEEE 802.11 protocol). Thus, one or more of the wireless interfaces 12, 14 and 16 may enable bidirectional wireless communication, such as including voice communications.

Since the system 10 implements at least two different wireless interfaces 12 and 14, various criteria can be utilized that distinguishes between the respective interfaces can be utilized to control the activation of the interface 14. For instance, one or more of the wireless interfaces 12 can be considered to operate in a wider network than the wireless network in which the other wireless interface 14 operates. The term "wider area" in this context refers to a relative coverage area of the networks supported by the wireless interfaces 12, 14 and 16. As an example, a GPS network would be considered to be wider than a WiFi network. Similarly, a cellular network and a WMAN are also considered to be wider than a WiFi network. Thus, for the example where the wireless interfaces 14 communicates via a WiFi network, the WiFi network can be considered to be an underlay network that resides network with an overlay network (e.g., GPS, cellular, WiMax or the like) associated with the wireless interface 12. Alternatively, or additionally, one of the interfaces might be considered to operate more efficiently than the other network, such that the more efficient interface can be left in the on state while the less efficient interface 14 is maintained in the off state.

The system 10 also includes an interface control system 18 that is configured to control one or more of the interfaces 12, 14 and 16 to reduce power consumption according to an aspect of the invention. The interface control system 18 can reduce power consumption by the mobile unit, for instance, by controlling activation of the wireless interface 14 from an off state to an on state in response to a predefined stimulus. The stimulus may be a radio frequency (RF) stimulus based on data that is received via or is otherwise associated with operation of one or more of the other wireless interfaces 12 and 16. Thus, the control system 18 can control operation of the wireless interface 14 in a normally off-operating state so that the additional power consumption associated with such operation does not occur. The control system 18 can operate one or more of the other wireless interfaces 12 and 16 in a normally on state to enable the stimulus to be detected and thereby activate the second wireless interface 14. The one or more other wireless interfaces 12 and 16 may remain on regardless of the state of the second wireless interface 14.

The interface control system 18 can include a stimulus detection component 20 that is programmed to detect the predefined stimulus. As described herein, the predefined stimulus can correspond to an operating state of one or more of the wireless interfaces 12 and 16. Alternatively, the predefined stimulus can correspond to a location of the mobile unit implementing the system 10. For instance, the stimulus detection component 20 can determine whether the mobile unit is located within a predefined proximity of a known or preferred network to which the second wireless interface 14 can be authenticated for operation. This determination can be made based on information contained an RF signal received via one or more of the other wireless interfaces 12 and 16.

The interface control system 18 also includes an activation control component 22 that is programmed to turn on or activate the second wireless interface in response to detecting the predefined stimulus. When activated, the second wireless interface 14 can search for and discover a wireless network to which it can be connected for communication. For example, the activation control component 22 can be programmed to activate the second wireless interface while the stimulus is detected. Additionally, the activation control component 22 can keep the second wireless interface in its on state for a predetermined length of time after the stimulus is no longer detected. Still further, the second interface may remain in the on state once it has been authenticated for operation over a corresponding wireless network.

By way of further example, the first wireless interface 12 can be implemented as an interface to a cellular network and the second wireless interface 14 can be implemented as an interface to a WiFi (e.g., IEEE 802.11) network. The activation control component 22 thus can activate the second wireless interface 14 from an off state to an on state in response to the stimulus detection component 20 detecting a predefined stimulus via the normally on (e.g., it is on while the mobile unit is on) wireless interface 12. At power up, in response to being activated, the second wireless interface 14 can perform a scanning procedure to discover an access point in a WiFi network. The scanning procedure may be part of an initialization sequence. Additional background scanning can be performed by the second wireless interface 14 after the initialization sequence. The details of such scanning can vary according to the protocol and other applications that may require scanning for the mobile unit. For instance, the second wireless interface 14 of the mobile unit can authenticate with a preferred (or trusted) enterprise network, such as may be programmed to provide for VoIP over WiFi via the second wireless interface 14 and corresponding resources in the enterprise network. Additionally, the enterprise network can be programmed to facilitate handover of a call session between different radio technologies, such as between cellular and WiFi networks. Thus, if call session is ongoing over the cellular interface when the WiFi interface is activated, the enterprise network can transfer (e.g., hand off) the call from the cellular network to a VoIP call over the preferred enterprise network after the WiFi interfaces has been authenticated in such network.

Figure 2:
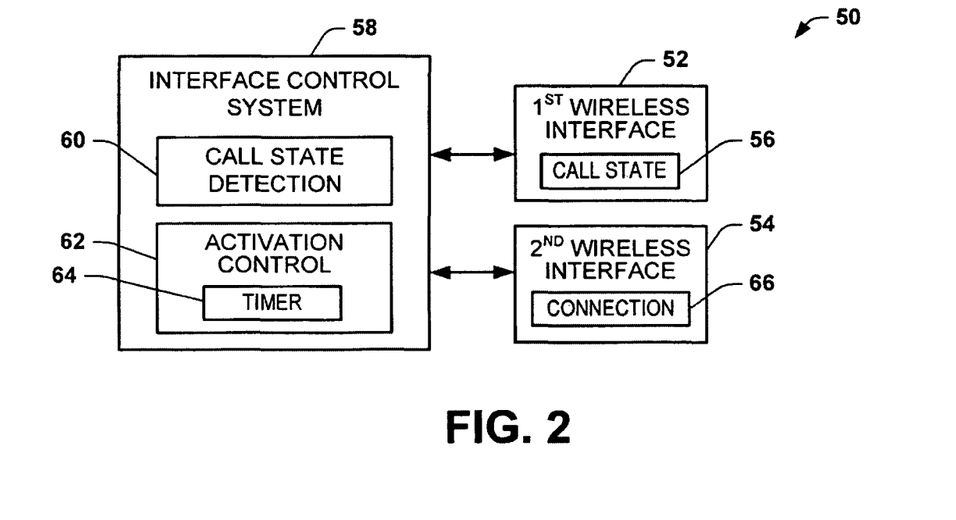
FIG. 2 depicts example of a system that can be implemented according to another embodiment of the invention.

FIG. 2 depicts an example of an embodiment of a system 50 that can be implemented to help reduce power consumption by a mobile unit. The system 50 includes a plurality of mobile interfaces, which are depicted as a first wireless interface 52 and a second wireless interface 54. Each of the first wireless interface 52 and the second wireless interface 54 is programmed and configured to communicate over a different respective type of wireless network. In the example of FIG. 2, the first wireless interface 52 is configured to communicate over a corresponding wireless network that is a wider type of network than the wireless network over which the second wireless interface 54 communicates. For example, if the second wireless interface 54 is WiFi interface, the first wireless interface can be a cellular interface (e.g., GSM, PCS or D-AMPS) or a WiMax interface. The first wireless interface 52 includes a controller or state machine that controls its operating state and provides an indication of its call operating state, indicated at call state indicator 56. The call state indicator 56 may include a value that identifies whether a call (e.g., a voice call) is connected through the first wireless interface. A voice call can be connected, for instance, in response to an outgoing voice call from the mobile unit as well as in response to an incoming voice call made from another device. Those skilled in the art will appreciate various fields and types of information that can be monitored to ascertain whether a call is connected over the first wireless interface 52, all of which may be considered as the call state indicator 56.

An interface control system 58 monitors the call state indicator 56 to control activation of the second wireless interface to an on state based on the detected call state of the first wireless interface. In the example of FIG. 2, the interface control system 58 thus includes a call state detection component 60 to determine whether a call is connected via the first wireless interface based on the value of the call state indicator 56. An activation control component 62 is programmed to activate the second wireless interface 54 in response to the call state detection component 60 detecting that a call is connected via the first wireless interface 52. The activation control 62 can provide instructions to turn on the second wireless interface 54 during the active call over the first wireless interface. In response to being activated, the second wireless interface 54 can perform a scanning procedure to discover an access point in a WiFi network. For instance, the mobile unit can authenticate with a preferred (or trusted) enterprise network, such as may be programmed to provide for VoIP over WiFi via the second wireless interface 54 and the enterprise network.

The activation control 62 can keep the second wireless interface 54 operating in on state during the connected call as well as for up to a predetermined time period after the call has been terminated at the first wireless interface 52. For example, the activation control 62 can include a timer 64 that is activated in response to the call state detection component 60 detecting a transition from a call connected state to a call disconnected (or terminated) state. After the predetermined time period of the timer 64 has expired, the activation control component 62 can deactivate or turn off the second wireless interface 54 such that it utilizes no power. Alternatively, if the second wireless interface 54 is connected to a wireless network, the activation control component 62 can employ the timer 64 to keep the second wireless interface 54 for a predetermined time period until after its connection with the wireless network has been terminated. Thus, the activation control 62 can deactivate the second wireless interface 54 from the on state to the powered off state in response to the timer 64 expiring prior to the second wireless interface establishing a connection with the second wireless network. The state of the connection between the second wireless interface 54 and a network can be determined by monitoring a call connection state indicator 66 of the second wireless interface 54.

The system 50 thus can help reduce power consumption by keeping the second wireless interface 54 normally deactivated (e.g., turned off). A call connected through the first wireless interface 52 can be utilized to trigger activation (e.g., turn on) the second wireless interface 54. This approach, for example, can be utilized to facilitate handover of a voice call from the first wireless interface (e.g., a cellular-based call over a cellular interface) to the second wireless interface 54, such as can be a VoIP call over an associated wireless network (e.g., a WiFi Network). The handover can occur seamlessly to the user, such as in response to coordination between a private branch exchange (PBX) application in an enterprise server and corresponding client application program running on the mobile unit. One example of systems and methods that can be implemented to control handover for a mobile unit are shown and described in U.S. patent application Ser. No. 11/778,831, which was filed on Jul. 17, 2007, and entitled SYSTEM AND METHOD TO FACILITATE HANDOVER, the specification of which is hereby incorporated herein by reference.

Figure 3:
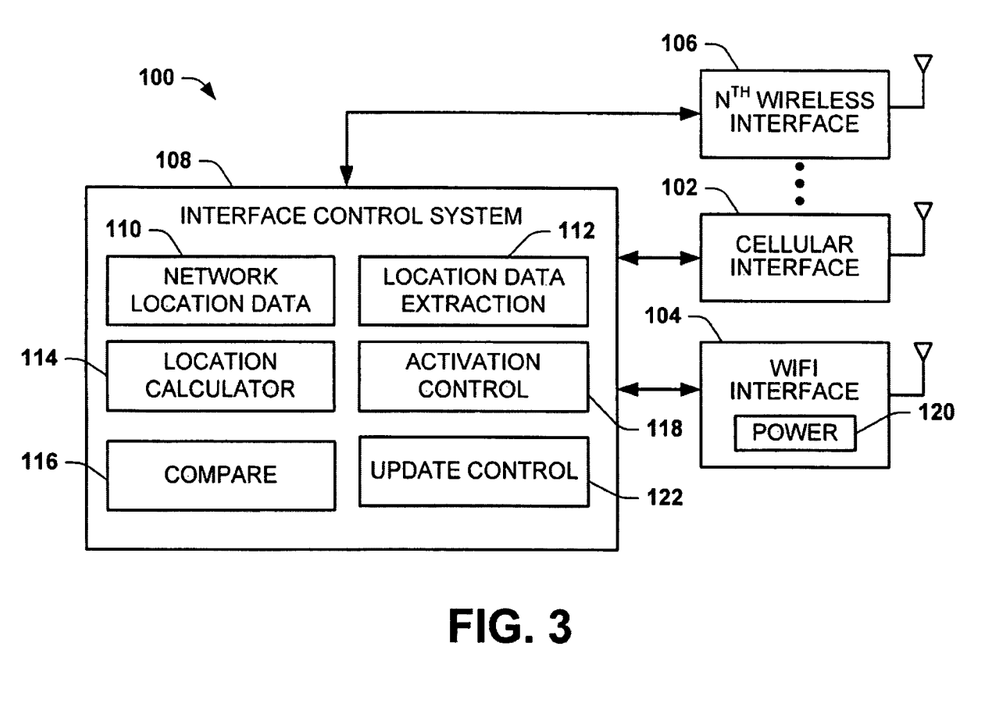
FIG. 3 depicts an example a system that can be implemented according to yet another embodiment of the invention.

FIG. 3 depicts another example of an embodiment of a system 100 that can be implemented to help reduce power consumption by a mobile unit. The approach depicted in FIG. 3 generally can be referred to as a 'location aware' power savings approach. This is because the system 100 controls activation of a wireless interface in response to a stimulus that relates to the location of the mobile unit, such as may be a relative proximity of the mobile unit to one or more trusted wireless networks.

The system 100 includes a plurality of mobile interfaces, which are depicted as a cellular interface 102, a WiFi interface 104 and an Nth wireless interface 106. Each of the cellular interface 102, the WiFi interface 104 and the Nth wireless interface 106 thus is programmed and configured to communicate over a different respective type of wireless network. In the example of FIG. 3, the cellular interface 102 is configured to communicate over a corresponding cellular network (e.g., 2G GSM, 3G GSM, PCS or D-AMPS), which is a wider type of network than the WiFi network(s) over which the WiFi interface 104 can communicate. Additionally, the Nth wireless interface 106 may also be configured to communicate over a wider network than the WiFi interface 104. For example, the Nth wireless interface 106 can be a different type of cellular interface than the interface 102, a GPS interface or a WiMax interface. Alternatively, the Nth wireless interface 106 may be a different type of wireless interface, such as a Bluetooth interface. The particular types of wireless interfaces implemented within a given mobile unit may vary from device to device according to application requirements.

The system 100 also includes an interface control system 108 that is programmed to control activation of the WiFi interface 104 in response to a stimulus that indicates the mobile unit is within a proximity range of one or more trusted or preferred wireless networks. This does not require that the proximity between the mobile unit and the preferred wireless network necessarily be sufficient to enable communication between the WiFi interface 104 and an access point of the preferred network. Instead, the proximity requirement can be a looser proximity range, such that there is an increased likelihood that communication between the WiFi interface 104 and an access point of the preferred network mobile may be enabled. A general goal of the location-aware control is to activate the WiFi interface at some time before or at least shortly after the mobile unit is within range of the preferred wireless network(s). The interface control system 108 thus is programmed and/or configured to determine when such circumstances occur.

By way of further example, the interface control system 108 includes network location data 110. The network location data 110 can include predefined location criteria that is associated with a geographical region or zone that includes one or more preferred wireless network. The network location data 110 thus can include a representation of information that can be compared relative to information acquired by the mobile unit to determine if the mobile unit resides in a pre-identified geographical region or zone that includes the preferred wireless network(s). The network location data 110 can be stored as a table, a list or other data structure that can be compared to location-identifying data, such as may be received via the cellular interface 102 or the Nth wireless interface. For the example of a cellular network the location-identifying data 110 may include one or more cellular network parameter, such as a cellular identifier (cell ID) for cell base station, a location area code (LAC), and a sector ID. The particular scheme or format of such information and how such information is encoded in a cellular network may vary according to the scheme implemented by the carrier to which the cellular interface is desired to operate.

The set of cellular location-identifying parameters can be acquired by monitoring such information by one or more mobile device that travels through a wireless enterprise network. For example, one or more cell ID, LAC, and/or a sector ID can be identified for each access point of the preferred wireless network and stored in the network location data 110. Additionally or alternatively, the network location data 110 can be programmed based on a known set of such data, such as may be provided by the carrier or carriers that provide services for a given region or zone (e.g., from a comparison of a cellular coverage maps with the location of the access points in the wireless enterprise network).

For the example of a GPS network, the location-identifying data can correspond to a set or range of GPS coordinates that can be derived from GPS data. For example, the location data for one or more preferred wireless networks can be stored in the network location data 110 according to a known coordinate system, such as latitude/longitude, using the WGS 84 geodetic datum, or another local system that may vary from country to country.

The interface control system 108 also includes a location extractor 112 that is programmed to monitor or query location-identifying data for the mobile unit from one or more of the other (active) wireless interfaces, such as the cellular interface 102 and/or the Nth wireless interface 106. For the example of GSM cellular interface 102, the location extractor 112 can obtain an appropriate combination of one or more of the cell ID, LAC, and a sector ID that is received via the cellular interface 102. For the example of GPS network, such as may be implemented by the Nth wireless interface 106, the location extractor 112 can obtain Coarse/Acquisition (C/A) code or, if available, the Precise (P) code from the interface. Alternatively, the interface 106 can be configured to compute coordinates, which coordinates can be obtained by the location data extractor 112.

A location calculator 114 can further determine an indication of the location from the extracted data, which can include conversion to a form consistent with the network location data 110. As described herein, the location can be the form of coordinates, or an identification of coverage area associated with a cellular base station or more general location area, such as may be defined by a LAC. It will be appreciated that any piece of such information that can be utilized to indicate a location of the mobile unit, such as within proximity of one or more preferred networks, can be utilized. A compare function 116 thus can be implemented to ascertain whether the location determined by the location calculator 114 substantially matches at least one of the pre-programmed location-indicating data in the network location data 110. Alternatively, the compare function 116 can determine a match based on a comparison of the extracted parameter(s) relative to the pre-programmed data in the network location data 110. A match thus occurs when the mobile unit resides within a predetermined region, such as may be defined to contain one or more known wireless networks.

As a further example, Table 1 depicts a possible set of location identifying data that can be stored in the network location data for a cellular network. From Table 1 it may be appreciated that a subset of such information can be utilized by the compare function 116 to determine whether the mobile unit is in proximity with the preferred wireless network(s). The particular set of information utilized may thus be programmed according to application requirements, such as may vary depending on whether a closer proximity range or a broader proximity range would be acceptable for triggering activation of the WiFi interface. Additionally, Table 1 might represent cellular location information for a given building that includes access points AP1, AP2, AP3, AP4 and AP5 in a multi-building enterprise. Accordingly, those skilled in the art will appreciate that the network location data 110 can be extended to accommodate different sizes and configurations of wireless networks and enterprises, which may include any number of wireless networks.

TABLE 1

| ACCESS POINT | CELL ID | LAC | SECTOR ID |
| --- | --- | --- | --- |
| AP1 | CID_2, CID_4 | LL5 | SS2 |
| AP2 | CID_2, CID_4, CID_5 | LL5 | SS3 |
| AP3 | CID_2, CID_4 | LL5 | SS2 |
| AP4 | CID_2, CID_3, CID_5 | LL5 | SS3 |
| AP5 | CID_2, CID_4, | LL5 | SS1 |

The interface control system 108 also includes an activation control component 118 is programmed to activate the WiFi interface 104 in response to the compare function 116 detecting a match between the location-identifying data determined by the location calculator relative to network location data 110. The activation control component 118 can provide instructions to activate (e.g., power up) power control 120 of the WiFi interface 104. The power control 120 can include hardware and software configured to provide for flow of electrical energy from a power system (e.g., battery) of the mobile unit to electrical circuitry of the interface 104. In response to being activated, the WiFi interface 104 can perform a scanning procedure for discovering one or more WiFi access point within range of the mobile unit. For instance, the WiFi interface 104 can authenticate with a preferred (or trusted) enterprise network, such as may be programmed to provide for VoIP over WiFi via the WiFi interface 104 and the enterprise network. Since the activation of the WiFi interface 104 can be contingent upon being located within a given distance from one or more preferred WiFi network, the system 100 can achieve significant reduction in power consumption relative to a system that keeps the WiFi interface activated (even when operating in an idle state). Additionally, the criteria utilized to trigger activation of the WiFi interface can be customized to a desired level geographic or regional specificity.

The activation control 118 can keep the second wireless interface on while the location parameters received via one or both of the interfaces 102 and 106 matches the network location data 110. Alternatively, the activation control 118 can activate the WiFi interface 104 for up to a predetermined time period until it has been determined that the interface has been associated with an pre-identified access point, such as according to information stored in the network location data 110.

As described herein, the approach shown and described with respect to FIG. 3, for example, can be utilized to facilitate handover of a voice call, such as from the cellular interface 102 (e.g., a traditional cellular call or a VoIP call over the cellular interface) to the WiFi interface 104, such as a VoIP call over an associated wireless network (e.g., a trusted WiFi Network). The handover can occur seamlessly to the user, such as in response to coordination between a private branch exchange (PBX) application in an enterprise server and corresponding client application program running on the mobile unit, such as set out in the above-incorporated U.S. patent application Ser. No. 11/778,831.

The interface control system 108 can also include an update control component 122 that is programmed to update the location parameters in the network location data 110. For example, the update control component 122 can request a set of location data from an application running on an enterprise server, such as through any of the wireless interfaces 102, 104 and 106 or through a hardwired or optical connection (not shown). Alternatively, the enterprise server can push the data to the mobile unit via the update control component 122 in response to detecting that the mobile unit is connected with the server through one or more of its wireless interfaces. The amount of information sent to the mobile unit can vary depending on, for example, the size of the enterprise and the available memory for the network location data 110. For instance, a first enterprise may have relatively small number of access points at one more geographical locations or campuses, while another enterprise may include a vast number of access points spread across a multitude of campuses throughout the world. For the latter type of enterprise, the update control 122 can request an update for the network location data 110 for a set of one or more local campuses, such as may be determined by the enterprise server from location information sent with the request from the mobile unit.

Figure 4:
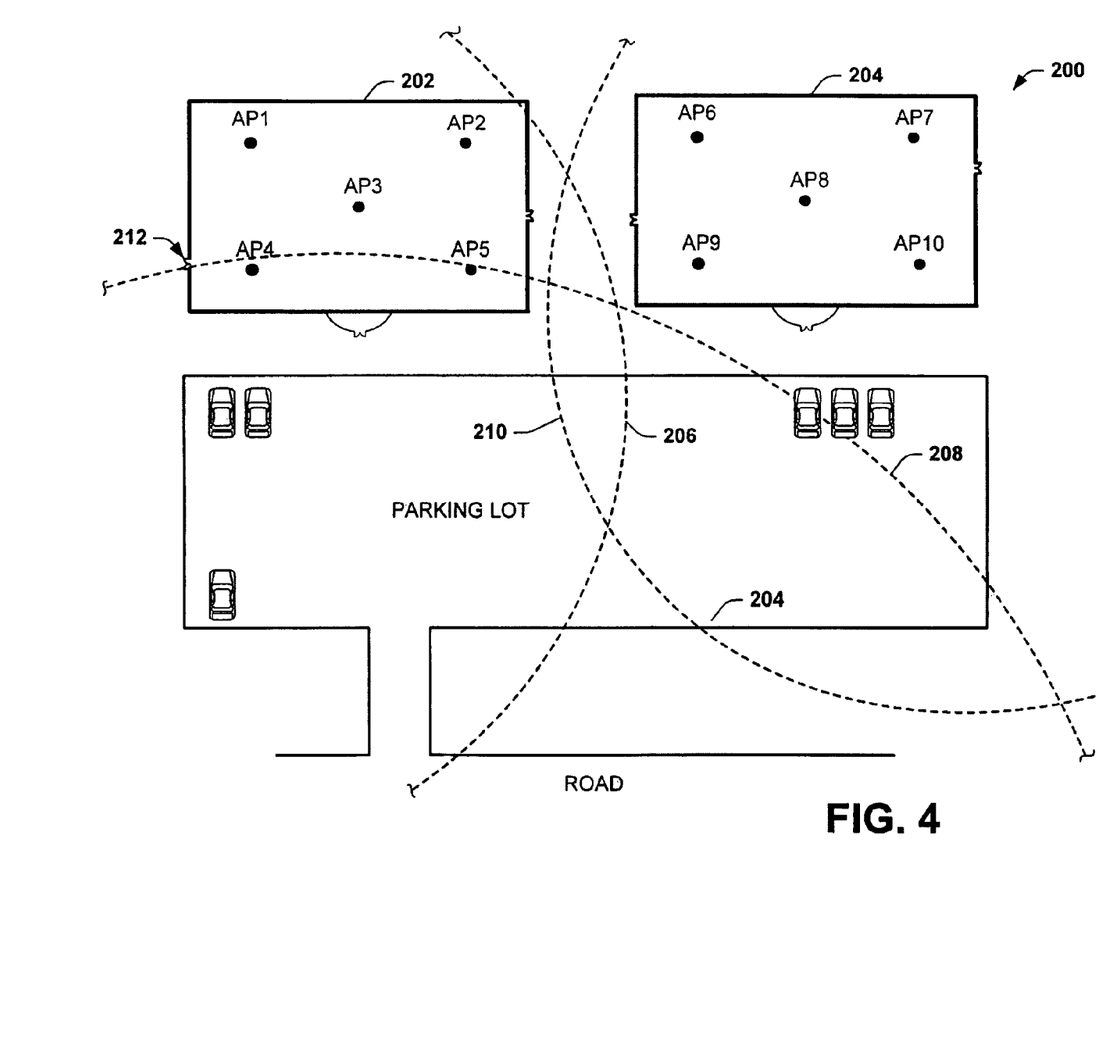
FIG. 4 is a diagram depicting an example of an enterprise for demonstrating how a mobile unit can reduce power consumption according to an aspect of the invention.

FIG. 4 depicts an example of a given area 200 that can implement a local wireless network, such as a WiFi or WiMax network. In the example of FIG. 4, the area 200 is depicted as a campus that includes two buildings 202 and 204, each of which includes five access points having an aggregate coverage area which defines local networks that form at least a portion of an enterprise network. Each building 202 and 204 can include one or more points of entry or egress through which mobile units may pass. In particular, the building 202 includes a plurality of access points AP1, AP2, AP3, AP4 and AP5 and the other building 204 includes another plurality of access points AP6, AP7, AP8, AP9 and AP10. Also depicted in FIG. 4 are three overlapping coverage areas 206, 208 and 210 for different cellular base stations or other base stations for networks that are wider than the local wireless network. Those skilled in the art will understand that the interrelationship between access points and coverage areas can vary according to the size and layout for a given area and further may include any number of separate wireless networks.

As described herein with respect to the examples of FIGS. 1-3, a mobile unit implemented according to an aspect of the invention can be programmed to activate a wireless interface from a powered off to an on state in response to a predefined stimulus. Such wireless interface, when activated, is configured to communicate in the wireless network that includes the access points in the area 200. In the absence of being activated, however, the mobile unit relies on one or more other types of wireless interfaces (e.g., a cellular interface) to send and receive voice calls.

In the location-aware power savings example of FIG. 3, the predefined stimulus can correspond to cellular network information associated with one or more of the cellular base stations that provide the coverage areas 206, 208 and 210. Thus, in response to detecting that the mobile unit moves into one or more of the coverage areas 206, 208 and 210 (e.g., as may be due to movement by a person or machine carrying the mobile unit), an activation control can turn on the wireless interface to scan for one of the access points AP1, AP2, AP3, AP4, AP5, AP6, AP7, AP8, AP9 and AP10 for the enterprise network.

Figure 5:
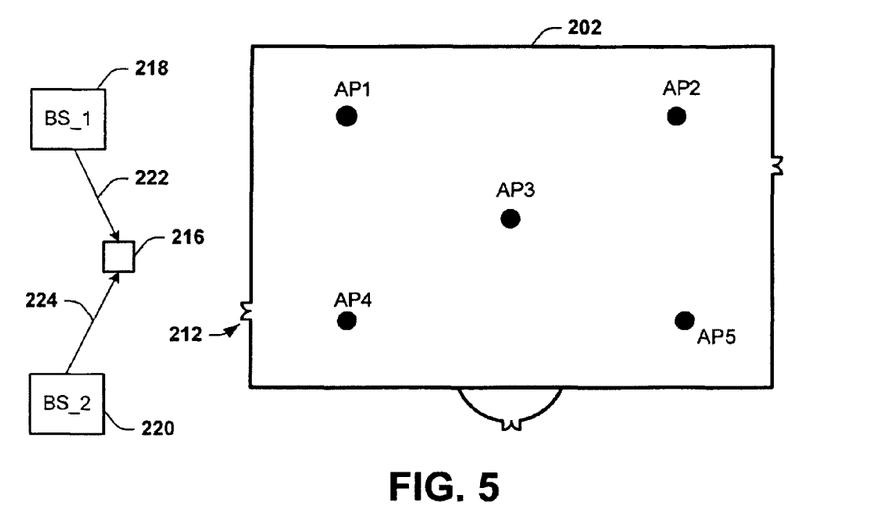
FIG. 5 depicts part of an enterprise demonstrating a mobile unit located at a first position in the enterprise according to an aspect of the invention.

As a further example, as shown in FIG. 5, a mobile unit 216 is located outside the building 202 and is within coverage areas 206 and 208 provided respectively by base stations 218 and 220. Each base station 218 and 220 can provide network parameters to the mobile unit, such as encoded in control information in signals 222 and 224 of respective downlink transmissions. The interface control of the mobile unit can determine that it resides within a proximity range of the wireless network and, in turn, activate the corresponding wireless interface, such as described herein, such that scanning procedures are initiated.

Figure 6:
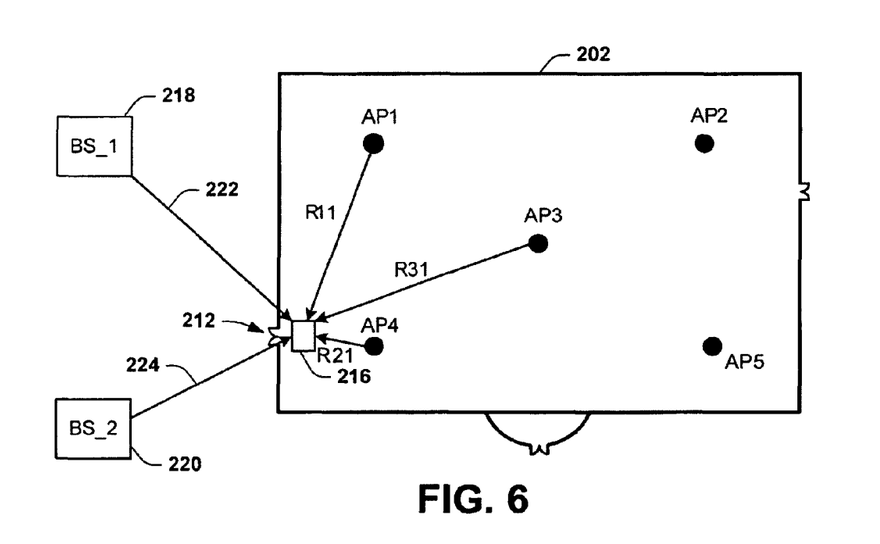
FIG. 6 depicts enterprise of FIG. 5 demonstrating the mobile unit at a second position in the enterprise according to an aspect of the invention.

In FIG. 6, the mobile unit 216 has entered the building 202 through the entry 212. The mobile unit still may receive cellular network parameters in signals 222 and 224 from the base stations 218 and 220. Additionally, within the building or near the entry 212, the mobile unit (already being turned on and scanning for wireless connection control applications can detect and cause the mobile unit to connect to one of the access points (e.g., AP1, AP3 or AP4). Thus, if a voice call is in progress as the mobile unit enters the building at entry 212, for example, after being authenticated into the local wireless network, higher level control functions (e.g., implemented within the enterprise network and the mobile unit) can perform a hand off the voice call from the cellular network to the local wireless network. The mobile unit thus may further move within the building and continue the voice call as VoIP call over the local wireless network. The wireless network further can handoff the mobile unit 216 to connection to any of the access points AP1, AP2, AP3, AP4 and AP5 as the mobile unit moves within the building 202.

Figure 7:
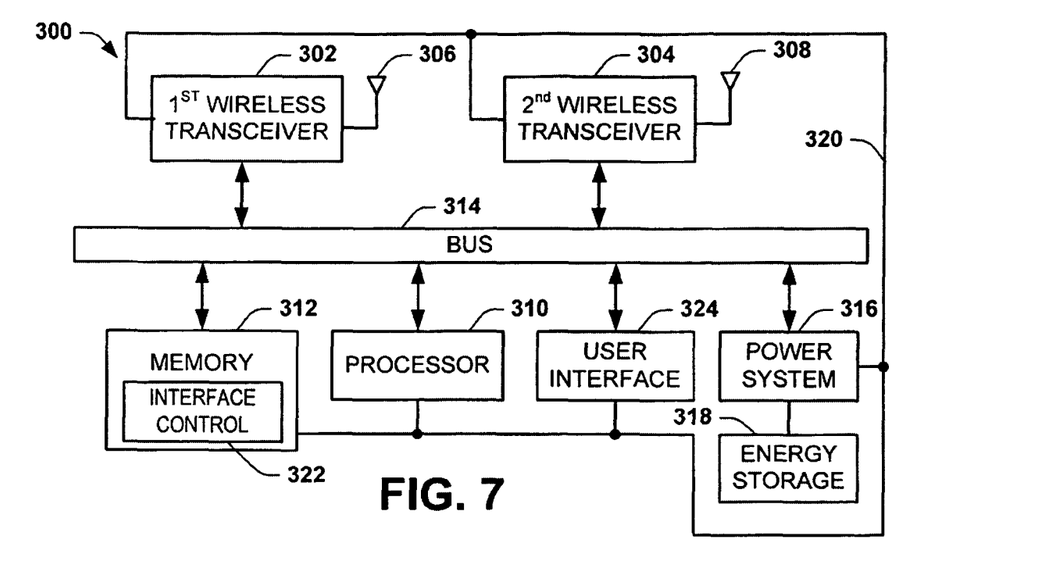
FIG. 7 depicts an example of a simplified block diagram of a mobile unit that can be implemented according to an aspect of the invention.

FIG. 7 depicts an example of a mobile unit 300 that can be implemented according to an aspect of the invention. The mobile unit 300 can be portable and thus can be carried or otherwise transported in space, such as by a user. The mobile unit 300 includes one or more wireless transceivers, which are indicated as a first wireless interface 302 and a second wireless interface 304. While two wireless interfaces are depicted in FIG. 7, it will be appreciated that there can be any number of two or more wireless interfaces. Each of the wireless interfaces 302 and 304 can be configured for bi-directional operation to send and receive wireless signals via corresponding antennas 306 and 308, respectively. For receiving signals, each wireless interface 302, 304 includes circuitry for demodulating and converting the received signals to an appropriate digital format for processing at the receiver as is known in the art. Each interface 302, 306 may also include circuitry for converting data being provided from the mobile unit 300 and from modulating and performing frequency conversion of such data and for sending such data out via the respective antennas 306 and 308.

The mobile unit 300 is configured to communicate using two or more different types of radio technologies operating according to respective wireless protocols. For example, the first wireless interface 302 can correspond to a cellular interface configured to communicate in an appropriate cellular network. The second wireless interface 304 can communicate in an underlying wireless network (e.g., WiFi Network or WiMax Network), which is a more local type of network than the wireless network of the first interface 302.

The mobile unit 300 also includes a processor 310 that is programmed and configured to control operation of the mobile unit based upon executable instructions stored in associated memory 312. The memory 312 can include random access memory (RAM), read only memory (ROM), flash memory, or other type or combination of memory devices. The processor 310 can communicate with each of the interfaces 302 and 304 via a bus 314. The processor 306 can also retrieve and store data and instructions relative to the memory 308 over the bus. Alternatively or additionally, the processor 306 may include cache or access other associated memory (not shown) directly.

All circuitry and components of the mobile unit can receive power from a power system 316, such as may be coupled to an energy storage device (e.g., battery) 318. The power system is coupled to distribute regulated electrical energy for use by the various components of the mobile unit, such as through a power bus 320. When the mobile unit 300 is powered on, for example, the unit can initialize itself, which includes activation of the first wireless interface (e.g., a cellular interface) or other interfaces (not shown). However, the second wireless interface 304 remains in a normally-off operating state until activated to an on operating state by an interface control 322 according to an aspect of the invention.

According to one embodiment, the interface control 322 can be implemented as a process or a routine that is stored in the memory 312. The interface control 322 thus can be executed by the processor 306, such as part of a power savings method for extending battery life of the mobile unit 300. For example, the interface control 322 can control operation of the second wireless interface 304 in a powered off operating state so that the additional power consumption associated with its operation does not normally occur, effectively extending the life of the internal energy storage device 318. The interface control system 322 can control activation of the second wireless interface 304 from the powered off state to a powered on state in response to a predefined stimulus. The predefined stimulus can be provided in an RF signal that is received by one or more of the other wireless interfaces (e.g., the first wireless interface 302). For instance, information contained in the received RF signal may indicate proximity of the mobile unit 300 to one or more preferred wireless network. Additionally or alternatively, the predefined stimulus can correspond to an operating state of the first wireless interface 302, such as being responsive to a voice call (e.g., a cellular or VoIP call) being connected through such interface.

The mobile unit 300 may also include a user interface 324 that can be employed by a user for interacting with the mobile unit 300. The user interface 324 can include an arrangement of graphical interface elements as well as buttons and other controls (e.g., knobs, dials and touch screen controls and the like) for implementing the various functions of the mobile unit 300. As one example, the user interface 324 can be utilized to manually turn on (or activate) the second wireless interface 304, such as when its use may be desirable by the user, but it has not been activated by the interface control 322. For instance, in the absence of the predefined stimulus, there are a variety of times when a user may wish to access a public or other available wireless network through the second wireless interface 304.

Figure 8:
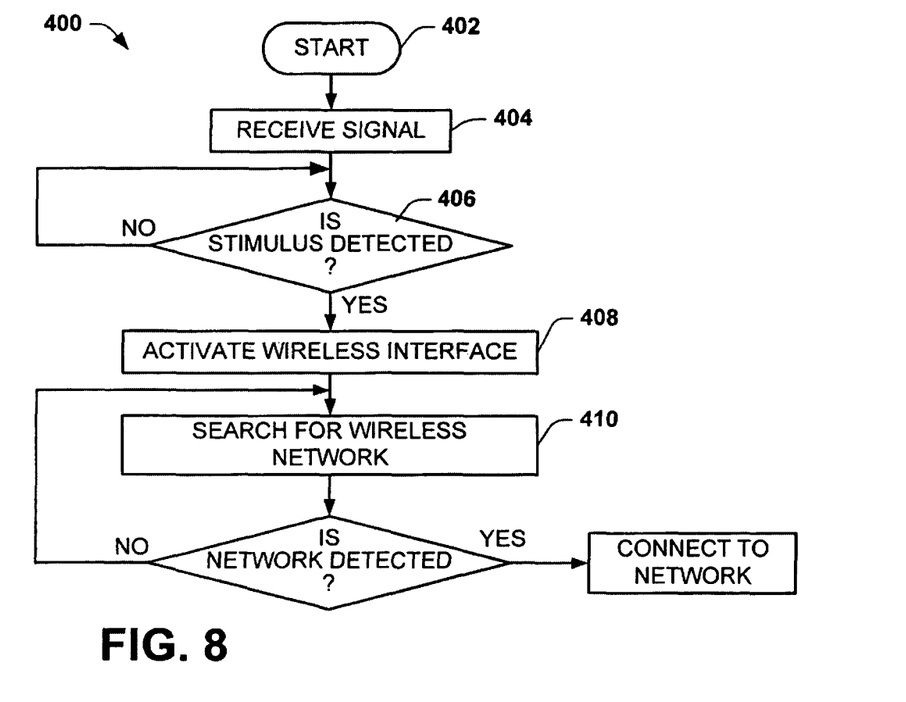
FIG. 8 is a flow diagram depicting a method according to an aspect of the invention.

In view of the structural and functional features described above, certain methods will be better appreciated with reference to FIG. 8. It is to be understood and appreciated that the illustrated actions, in other embodiments, may occur in different orders or concurrently with other actions. Moreover, not all features illustrated in FIG. 8 may be required to implement a method according to the subject invention. It is to be further understood that the following methodology can be implemented in hardware (e.g., one or more processors, such as in a computer or a processor based device), software (e.g., stored in a computer readable medium or as executable instructions running on one or more processors), or as a combination of hardware and software.

FIG. 8 depicts a method 400 that can be utilized to help conserve power for a mobile unit. The method begins at 402 in which the mobile unit is power-up (or turned on). The mobile unit includes at least two wireless interfaces. At such power up at least one wireless interface is activated to at least receive RF signals, while another wireless interface remains deactivated (e.g., it is powered off). For instance, the powered up interface can be a cellular interface or a GPS interface or an interface for a wider wireless network than the deactivated wireless interface.

At 404, an RF signal is received via one or more of the activated interfaces. The received signal can include information that can be decoded to ascertain an indication of a proximity of the mobile unit to one or more local wireless network. Alternatively, the received signal can be associated with a voice call that is associated with operation of one of the activated interfaces. At 406, a determination is made as to whether a predefined stimulus has been detected. The stimulus can result from the received signal. For example, the stimulus can correspond to an indication of a proximity of the mobile unit to one or more local wireless network (derived from information contained in the signal received at 404) or it may correspond to a predetermined operating state of the activated wireless interface. If the predetermined stimulus is not detected, the method can return to 404 so that the deactivated wireless interface remains deactivated, thereby not consuming electrical energy from the battery. If the stimulus is detected, the method 400 can proceed from 406 to 408 in which the deactivated wireless interface is activated from the off-state to an on-state.

At 410, the activated wireless interface can search for an available wireless network. For example for a WiFi interface, the search (at 410) can be implemented as a scanning procedure according to an IEEE 802.11x protocol. At 412, a determination is made as to whether a network is detected responsive to the search at 410. If no wireless network is detected, the method can return to 410 to continue searching. The search may continue indefinitely or it may be timed out such as described herein. If a network is detected, the method 400 can proceed from 412 to 414 in which the wireless interface can associate itself with the detected network according to the network protocol.

In view of the foregoing, those skilled in the art will appreciate that systems and methods have been described to provide means for controlling activation of a wireless interface in a manner that helps reduce power consumption for a mobile unit. For instance, the approaches described herein provide for an increased likelihood that a mobile unit will keep a wireless network deactivated until the mobile unit is either in an operating state (e.g., a connected voice call) or is determined to be near a known or preferred wireless network.

What have been described above are examples and embodiments of the invention. It is, of course, not possible to describe every conceivable combination of components or methodologies for purposes of describing the invention, but one of ordinary skill in the art will recognize that many further combinations and permutations of the present invention are possible. Accordingly, the invention is intended to embrace all such alterations, modifications and variations that fall within the scope of the appended claims. In the claims, unless otherwise indicated, the article "a" is to refer to "one or more than one."

What is claimed is:

1. A non-transitory computer readable medium storing instructions executable by a processor, the instructions comprising:
    an interface control configured to control a first wireless interface and a second wireless interface, the first wireless interface configured to at least receive communication over a first wireless network, the second wireless interface configured to provide for bidirectional communication over a second wireless network, the interface control further configured to extract at least one identifier from information received via the first wireless interface, the interface control being operative to control activation of the second wireless interface from an off state to an on state based on a comparison of the extracted at least one identifier relative to data stored in memory of a wireless mobile unit, the first wireless interface remaining in an on state regardless of the state of the second wireless interface;
    pre-programmed location data that defines at least one predetermined area located within the first wireless network and which is associated with at least one of a predefined coverage area associated with the second wireless network and a known access point for the second wireless network, the interface control being configured to activate the second wireless interface from the off state to the on state in response to at least one network parameter of the first wireless network substantially matching the pre-programmed location data; and
    a timer that controls the second wireless interface to search for discovery of the second wireless network for a predetermined length of time, the interface control deactivating the second wireless interface from the on state to the off state in response to the timer expiring prior to the second wireless interface establishing a connection with the second wireless network.

2. The medium of claim 1, wherein the first wireless network comprises a cellular communications network that provides for bidirectional wireless communication over a corresponding network, the cellular communications network being a wider type of network than the second wireless network.

3. The medium of claim 2 wherein the second wireless network comprises a wireless local area network, the second wireless interface comprising a WiFi interface configured to remain in a normally off state until activated by the interface control.

4. The medium of claim 2, wherein the at least one identifier comprises at least one predefined identifier for a cellular base station operating in the first wireless network.

5. The medium of claim 1, further comprising an extractor programmed to extract the at least one identifier from a radio frequency signal received via the first wireless interface, the interface control controlling activation of the second wireless interface based on the at least one identifier extracted from the radio frequency signal.

6. The medium of claim 5, wherein the at least one identifier extracted from the radio frequency signal further comprises the at least one network parameter of the first wireless network, the at least one network parameter being indicative of a location of the wireless mobile unit within the first wireless network.

7. The medium of claim 1, further comprising an update control programmed to update the memory with location data received via at least one of the first wireless interface and the second wireless interface.

8. The medium of claim 1, wherein the first wireless network comprises a cellular communications network and the pre-programmed location data comprises at least one of a cell identifier for a cellular base station, a location area code for at least one cellular base station and a sector identifier for a cellular base station.

9. The medium of claim 1, wherein the at least one predetermined area located within the first wireless network contains at least one predetermined wireless network to which the second wireless interface is configured to connect.

10. The medium of claim 1, wherein the data stored in memory of the wireless mobile unit further comprises identifiers for a plurality of access points operating in the second wireless network associated with predefined location-identifying data for base stations operating in the first wireless network.

11. The medium of claim 10, wherein the medium is configured to acquire the location-identifying data for at least a portion of the plurality of access points as the mobile unit travels through a preferred wireless network for which the mobile unit is configured to connect and to store the acquired location-identifying data associated with respective access points of the preferred wireless network in the memory of the wireless mobile unit.

12. The medium of claim 10, wherein at least a portion of the location-identifying data for at least a portion of the plurality of access points are programmed in the memory of the wireless mobile unit based on data provided by one or more carrier that provides wireless services in the first wireless network.

13. The medium of claim 1, wherein the at least one identifier represents a pre-identified region or zone within the first wireless network that indicates a likelihood of the mobile unit residing within a preferred second wireless network that the second wireless interface is configured to connect.

14. A non-transitory computer readable medium storing instructions executable by a processor, the instructions, comprising:
    an interface control configured to control a first wireless interface and a second wireless interface, the first wireless interface configured to at least receive communication over a first wireless network, the second wireless interface configured to provide for bidirectional communication over a second wireless network, the interface control operative to control activation of the second wireless interface from an off state to an on state in response to a predefined radio frequency (RF) stimulus comprising an occurrence of an active voice call session over the first wireless network that is detected by the interface control, the first wireless interface remaining in an on state regardless of the state of the second wireless interface;

pre-programmed location data that defines at least one predetermined area located within the first wireless network and which is associated with at least one of a predefined coverage area associated with the second wireless network and a known access point for the second wireless network, the interface control being configured to activate the second wireless network from the off state to the on state in response to at least one network parameter of the first wireless network substantially matching the pre-programmed location data; and a timer that controls the second wireless interface to search for discovery of the second wireless network for a predetermined length of time, the interface control deactivating the second wireless interface from the on state to the off state in response to the timer expiring prior to the second wireless interface establishing a connection with the second wireless network.

15. The medium of claim 14, wherein the interface control activates the second wireless interface from the powered off to powered on state to search for at least one predefined identifier in the second wireless network in response to detecting the occurrence of the active voice call session over the first wireless network.

16. The medium of claim 15, wherein the second wireless interface continues to search for the at least one predefined identifier in the second wireless network during the active call session over the first wireless network, and wherein if the second wireless interface connects to the second wireless network during the active voice call session over the first wireless network, the second wireless network remains connected with the second wireless network until such connection is lost.

17. The medium of claim 15, further comprising a timer that controls the second wireless interface to search for discovery of the second wireless network for a predetermined length of time after being activated to the powered on state, the interface control deactivating the second wireless interface from the powered on state to the powered off state in response to the timer expiring prior to the second wireless interface establishing a connection with the second wireless network.

18. A wireless mobile unit, comprising:
a first wireless interface configured to provide for bidirectional communication over a first wireless network;
a second wireless interface configured to provide for bidirectional communication over a second wireless network, the first wireless network being a wider network than the second wireless network;
an interface control operative to activate the second wireless interface from a powered-off state to an on state based on communication that occurs via the first wireless interface, the first wireless interface remaining in an on state regardless of the state of the second wireless interface;
memory that stores pre-programmed location data that defines at least one predetermined area located within the first wireless network and which is associated with at least one of a predefined coverage area associated with the second wireless network and a known access point of the second wireless network, the interface control being configured to activate the second wireless network from the off state to the on state in response to at least one network parameter of the first wireless network substantially matching the pre-programmed location data; and a timer that controls the second wireless interface to search for discovery of the second wireless network for a predetermined length of time, the interface control deactivating the second wireless interface from the on state to the off state in response to the timer expiring prior to the second wireless interface establishing a connection with the second wireless network.

19. The wireless mobile unit of claim 18, wherein the second wireless interface comprises a WiFi interface configured to remain normally in the powered-off state until activated by the interface control, and wherein the first wireless interface comprises a cellular interface.

20. The wireless mobile unit of claim 18, further comprising an extractor programmed to extract information from a radio frequency signal received via the first wireless interface, the interface control controlling activation of the second wireless interface based on the information extracted from the radio frequency signal.

21. The wireless mobile unit of claim 20, wherein the information extracted from the radio frequency signal further comprises the at least one network parameter indicative of a location of the wireless mobile unit within the first wireless network.

22. The wireless mobile unit of claim 21, further comprising memory that stores pre-programmed location data that defines at least one predetermined area or region located within the first wireless network, the interface control activates the second wireless network from the powered-off state to the on state in response to the at least one network parameter substantially matching the pre-programmed location data.

23. The wireless mobile unit of claim 22, wherein the pre-programmed location data comprises at least one of an identifier for a base station, a location area code for at least one base station and GPS coordinates.

24. The wireless mobile unit of claim 18, wherein the first wireless interface further comprises a call state indicator associated with the communication that occurs via the first wireless interface, the interface control activating the second wireless interface from the powered-off state to the on state based on the call state indicator indicating an occurrence of an active call.

25. The wireless mobile unit of claim 24, further comprising a timer that controls a length of time that the second wireless interface searches for discovery of at least one predetermined wireless network after the call state indicator indicates the absence of an active call.

26. A method to help reduce power consumption in a mobile unit that includes a plurality of wireless interfaces, the method comprising:
operating at least a first of the plurality of wireless interfaces to be capable of receiving a radio frequency signal;
controlling activation of a second of the plurality of wireless interfaces from a powered off state to an on state based on at least one of (i) an operating state of the first of the plurality of the wireless interfaces and (ii) a location of the mobile unit that is determined based on a comparison of at least one identifier extracted from information in a radio frequency signal received via the first of the plurality of wireless interfaces relative to corresponding location-identifying information stored in memory of the mobile unit;

performing a scan procedure to search for a wireless network for connection by the second of the plurality of wireless interfaces for a predetermined length of time in response to the second of the plurality of wireless interfaces being activated to the on state; and deactivating the second of the plurality of wireless interfaces from the off state to the on state in response to the predetermined length of time expiring prior to the second of the plurality of wireless interfaces establishing a connection with the second wireless network.

27. The method of claim 26, further comprising:

receiving the radio frequency signal via the first of the plurality of wireless interfaces;

extracting the at least one identifier from the received radio frequency signal;

determining the location of the mobile unit from the extracted at least one identifier; and activating the second of the plurality of wireless interfaces from the powered off state to the on state if the extracted at least one identifier substantially matches the location-identifying information stored in the memory of the mobile unit, which indicates that the mobile unit resides within at least one predetermined geographical region containing a preferred wireless network for operating the second of the plurality of wireless interfaces.

28. The method of claim 26, wherein the first of the plurality of wireless interfaces comprises a cellular interface and the second of the plurality of wireless interfaces comprises an interface for connection to wireless local area network that supports voice over internet protocol.

29. A non-transitory computer readable medium storing instructions executable by a processor, the instructions, comprising:

an interface control configured to control a first wireless interface and a second wireless interface, the first wireless interface configured to at least receive communication over a cellular communications network, the second wireless interface configured to provide for bidirectional communication over an enterprise WiFi network, the interface control further configured to extract at least one identifier from information received via the first wireless interface, the interface control being operative to control activation of the second wireless interface from an off state to an on state based on a comparison of the extracted at least one identifier relative to data stored in memory of the wireless mobile unit, the first wireless interface remaining in an on state regardless of the state of the second wireless interface;

pre-programmed location data comprising at least one of a cell identifier for a cellular base station, a location area code for at least one cellular base station and a sector identifier for a cellular base station defining at least one predetermined area located within the cellular communications network, the interface control activation of the second wireless interface from the off state to the on state in response to at least one network parameter of the cellular communications network substantially matching the pre-programmed location data; and a timer that controls the second wireless interface to search for discovery of the second wireless network for a predetermined length of time, the interface control deactivating the second wireless interface from the on state to the off state in response to the timer expiring prior to the second wireless interface establishing a connection with the second wireless network.

\* \* \* \* \*